H. W. STEELE.

SPRING HINGE.

APPLICATION FILED SEPT. 23, 1908.

Reissued June 22, 1909. 12,978.

Witnesses:

Julius Kurz

A. Becker.

Inventor

Harry W. Steele

By his Attorneys

Criswell & Criswell

UNITED STATES PATENT OFFICE.

HARRY W. STEELE, OF SHELBY, OHIO, ASSIGNOR TO THE SHELBY SPRING HINGE CO., A CORPORATION OF OHIO.

SPRING-HINGE.

No. 12,978. Specification of Reissued Letters Patent. Reissued June 22, 1909.

Original No. 833,852, dated October 23, 1906, Serial No. 293,986, Application for reissue filed September 23, 1908. Serial No. 454,457.

*To all whom it may concern:*

Be it known that I, HARRY W. STEELE, a citizen of the United States, residing at Shelby, Ohio, have invented certain new and useful Improvements in Spring-Hinges, of which the following is a full, clear, and exact description.

My invention relates to improvements in double-acting spring-hinges.

One of the objects of my invention is to provide a simple and compact form of spring which can be easily applied to a rabbet or recess in the lower corner of the door without detracting from the appearance or finish thereof.

Another object is to provide a spring-hinge which shall possess all the advantages of a floor-hinge, (or hinge located in a recess in the floor,) while by its location all danger of moisture getting into the mechanism of the hinge is avoided.

Other objects are to simplify the construction, render it more durable and certain in operation, reduce friction and wear, and make the parts more readily adjustable to vary the tension on the hinge.

With these and other objects in view the invention includes the features of construction and arrangement and combination of parts hereinafter described, and particularly set forth in the appended claims.

The invention is illustrated in the accompanying drawings, in which—

Figure 1:
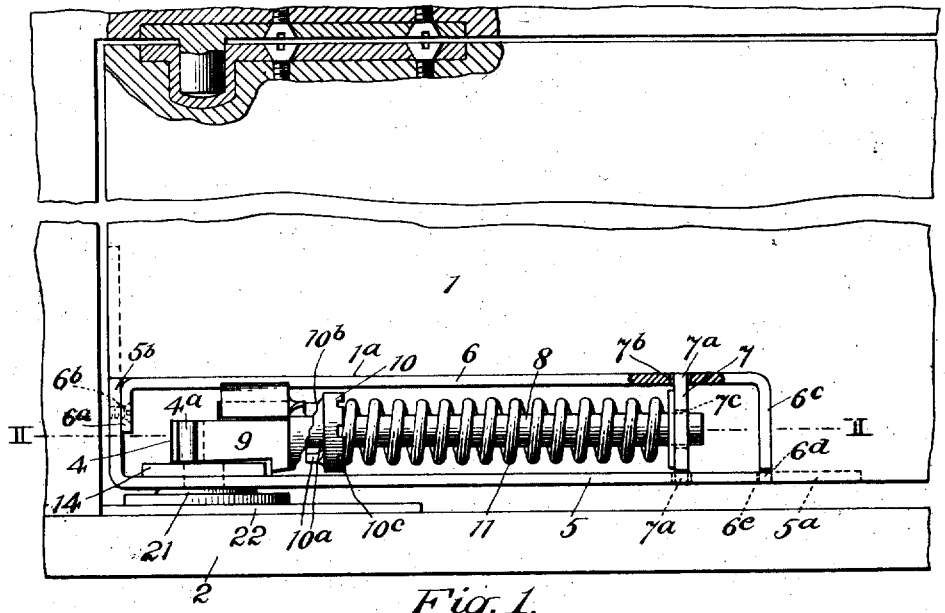
Figure 2:
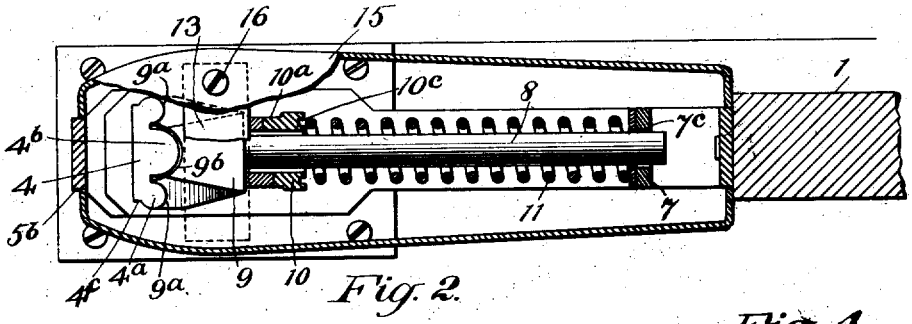
Figure 3:
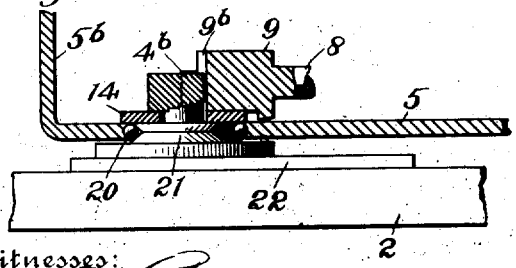
Figure 4:
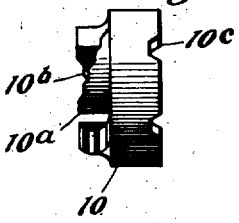

Figure 1 is a sectional elevation of a portion of a door and its frame, disclosing the hinged construction embodying my invention as applied thereto. Fig. 2 is a horizontal section on line II—II of Fig. 1. Fig. 3 is a sectional detail of certain features of the hinge construction. Fig. 4 is a detail view in elevation of the adjusting-ring.

As disclosed in the drawings, the hinge comprises in its construction two members, one of which is fixed and the other movable thereon. The movable member is secured to the door and includes the spring-actuating mechanism, while the other or fixed member, which includes the pivot-post, is secured to the floor or door-sill, and it is the movement of the movable member upon the fixed member which causes the eccentric portions of the head of the post to move the bolt and increase the tension of the spring.

Referring by reference characters to the drawings, the numeral 1 designates the door, and 2 the floor, to which is secured a floor-plate by which the pivot-post 3 is rigidly carried. The post 3 carries at its upper end a cross-head 4, having rounded ears or projections $4^a$ and an intermediate rounded portion $4^b$.

The operative parts of the spring-hinge are located in a rabbet or recess $1^a$ in the lower corner of the door and are carried by a plate, bar, or member 5, which has one end $5^a$ secured to the bottom edge of the door by screws or the like and its other end enlarged and provided with an angularly-turned end $5^b$ similarly secured to the vertical edge of the door. A strip, member, or bar 6 has one of its angularly-turned ends $6^a$ detachably secured to the end $5^b$ of the plate 5 in a suitable manner, as by screw $6^b$, while its other angular end $6^c$ is detachably connected to the horizontal portion of the plate 5, preferably by having a projection $6^d$ seated in a recess $6^e$ in the plate. The spring and co-operating parts are located between these two bars or members 5 and 6, which thus constitute a frame therefor, or what I have hereinbefore termed a "movable member," and forms a part of the hinge casing.

Near the outer or swinging end of the frame is located a pivoted plate 7, which may conveniently be supported by having integral projections or trunnions $7^a$ seated in recesses $7^b$ in the members 5 and 6, and in an opening $7^c$ in this plate is guided one end of a rod or bolt 8, so as to be freely movable therein in a longitudinal direction, the bolt having a certain amount of lateral swinging movement as the door swings and the plate 7 being pivoted to allow this. At the opposite end the bolt is provided with a head 9, which is slidingly supported upon the plate 14 and which has in its face a central curved recess $9^b$, corresponding to the rounded portion $4^b$ of the head of the post, and side recesses $9^a$, corresponding to the rounded projections $4^a$ of the post-head. An adjusting-ring 10 is rotatably mounted on the rod or bolt 8 and has a plurality of inclines $10^a$, each of which is flattened at intervals, as indicated at $10^b$. The rod or bolt 8 is provided with lateral projections corresponding to these inclines. Square recesses $10^c$ are cut in the opposite face of the adjusting-ring and it will be readily seen that by inserting a suitable instrument having a square end in these notches the ring may be turned so as to cause the inclines to act upon the projections of the bolt or rod, thus forcing the collar outwardly thereof. This results in adjusting the tension of the spring 11, which encircles the rod or bolt 8 and is confined between the adjusting-ring 10 and the plate 7.

From the foregoing description it will be readily seen that when the door is in normal and closed position both the rounded projections of the head of the post would rest in the recesses of the head of the bolt. When, however, the door is swung in either direction, the action of one or the other of the projections 4[a], owing to their eccentric relation to the pivot, will cause the bolt 8 to be moved outwardly, carrying with it the collar 10 and compressing the spring, thus resisting the tendency of the door to open. The compression on the spring will be increased the farther the door is opened until the door has reached a position at right angles to its closed position. A slight further opening movement of the door carries it past the dead-center, so that the spring tends to open it wider, and in order that it may not be opened too wide, but may be held automatically in its open position, I provide shoulders 4[c] on the head of the post against which the corners on the head of the bolt project, thus limiting the swinging movement of the door. By the use of these rounded projections and corresponding recesses on the post and bolt heads arranged in the manner shown the lateral swinging of the bolt 8 is practically eliminated, and I am therefore enabled to dispense with the use of any link or pitman connection, thereby greatly simplifying the construction, reducing the cost, and making the device more durable. Further, the coacting rounded faces of the bolt and post heads afford bearing-surfaces of sufficient extent to reduce the wear to a minimum, and being packed in grease the friction is almost entirely eliminated.

A transverse plate or member 13 is secured to the frame member 6 immediately over the head 9 of the bolt against which the head of the bolt may rest in its movement while compressing the spring and which provides an upper bearing surface and guide for the bolt head, and under the bolt head is a bearing plate or member 14 which is rigidly secured to the frame member 5 and which serves as a lower bearing surface and guide for said bolt head, thus confining the head between the two plates so as to properly guide the same in its movement.

In order to provide a neat finish, the sides of the rabbet are covered with ornamental plates 15, preferably of the shape shown, which may be secured in place by set-screws 16, engaging the cross-members 13 carried by the upper bar.

I find it desirable also to support the door upon a ball bearing, the balls 20 being located in a raceway formed by an annular groove in the frame member 5, and a substantially V-shaped shoulder or enlarged part 21 carried by the floor plate 22 and located between said floor plate and the plate 14, thus making the members more readily movable with respect to each other.

Having thus described my invention, what I claim is—

1. A spring-hinge comprising a movable part, a rigid post about which the movable part pivots, a bolt slidably carried by the movable part, said bolt and said post each having a head, one of said heads having a rounded projection on each side of the center and the other head having corresponding recesses and a spring encircling the bolt between relatively fixed and movable abutments, substantially as described.

2. A spring-hinge comprising a movable part, a rigid post about which the movable part pivots, having rounded projections on opposite sides thereof and shoulders in proximity to said rounded projections, a bolt carried by the movable part and longitudinally movable thereof, said bolt having a head having concave recesses on opposite sides of its center corresponding to the projections on the post-head, and a spring encircling the bolt between relatively fixed and movable projections, substantially as described.

3. A spring-hinge comprising a suitable spring-containing frame for attachment to a door, a rigid post about which said frame pivots, said post having a T-shaped head, a bolt mounted in said frame to have longitudinal reciprocating movement and also transverse swinging movement, said bolt having a head corresponding to the head on the post, and a spring encircling the bolt and which is compressed by longitudinal movement thereof, substantially as described.

4. A spring-hinge comprising parallel bars with means for securing them to the door, a plate supported between the said bars near the outer end, a bolt having its outer end slidably mounted in an opening in said plate, a rigid post about which the door pivots having a T-shaped head, a corresponding head on the bolt coacting therewith, an adjusting-collar on the bolt, and a helical spring encircling the bolt between the collar and plate, substantially as described.

5. A spring-hinge comprising parallel bars, with means for securing them to a door, a plate constructed to be pivotally seated in the holes in said bars near their outer ends, a post about which the door pivots having a T-shaped head, a bolt having its outer end slidably mounted in said pivoted plate, a spring encircling said bolt, and means on the bolt for adjusting the tension of the spring, substantially as described.

6. A spring-hinge comprising a movable member constructed for attachment to a door, a rigid post about which said movable member swings having a substantially T-shaped head, a slidable bolt carried by the movable member having a corresponding head coacting with the head on the post, a spring encircling said bolt, between relatively fixed and movable abutments, and means interposed between the spring and one of said abutments for varying the tension of the spring, said means comprising a rotatable collar on the bolt having a plurality of inclines or cams constructed to coact with projections on the bolt, substantially as described.

7. In a spring-hinge, a frame for carrying the parts comprising an L-shaped bar with means for securing its ends to the edges of the door, and a second L-shaped bar reversely arranged with relation to the first bar and having its ends detachably connected to the first-named bar, substantially as described.

8. In a spring-hinge, the frame adapted to be secured to the lower corner of the door, and comprising upper and lower members, a post extending through the lower member and having a substantially T-shaped head, a base-plate by which said post is carried, an antifriction-bearing between the base-plate and lower frame member, a bolt longitudinally movable in the frame and having a head constructed to engage the head of the post, a spring within the frame, and means whereby in connection with said bolt the spring is placed under tension on the swinging of the frame, substantially as described.

9. A spring hinge of the type set forth, comprising a movable member consisting of a frame composed of parallel bars rigidly connected together at their ends and separated one above the other, said frame having its lower bar extended at one end, as at $5^a$, for attaching the frame to the bottom edge of the door, and spring-actuated working parts in said frame, and a stationary member adapted for attachment to the floor and having means thereon for operative engagement with said spring-actuated parts.

10. The combination with a normally fixed member and a rigid post, of a movable member comprising a frame having two opposed parallel bars, a transversely extending plate held to one of the bars, a bolt provided with an enlarged head at one end held to slide in said frame and under said plate and engage the rigid post, adjusting means arranged on the bolt, and a spring acting against the adjusting means to move said bolt in one direction.

11. The combination with a normally fixed member and a rigid post, of a movable member comprising a frame having two opposed parallel bars, a transverse plate carried by the upper bar, a vertical plate held between the bars, a bolt provided with an enlarged head at one end and having its other end held to slide in said vertical plate, said headed end being guided in the frame by said transverse plate and engaged by the rigid post, adjusting means, and a spring interposed between said vertical plate and the adjusting means.

12. In a spring hinge of the type set forth, the combination with an open-sided frame having a transverse plate attached to the under side of the upper bar of said frame, of means attached to said transverse plate for closing the open sides of said frame.

13. In a spring hinge of the type set forth, the combination with an open-sided frame adapted for attachment to the bottom edge of the door, of means for closing the open sides of said frame, and means for attaching said closure means to the upper bar of the frame.

14. A spring hinge of the type set forth, comprising a movable member, said movable member consisting of a pair of parallel bars supported one above the other and rigidly attached together at their ends, said member having its lower bar extended at one end to afford a means of attachment to the bottom edge of the door and having an upward extension at its other end to afford means of attachment to the vertical edge of the door, and spring-actuated working parts in said frame, and a stationary member adapted for attachment to the floor and having means thereon for operative engagement with said spring-actuated parts.

15. A spring hinge of the type set forth, comprising a movable member adapted for attachment in a rabbet in the lower edge of the door and comprising a pair of parallel bars supported one above the other and rigidly connected together at their ends, the ends of the bars being angularly bent for this purpose, and spring-actuated working parts confined between said bars, and a stationary member adapted for attachment to the floor and having means thereon for operative engagement with said spring-actuated parts.

16. A spring hinge of the type set forth, comprising a movable member adapted for attachment in a rabbet in the lower edge of the door and comprising a pair of parallel bars supported one above the other, one end of the upper bar being bent downward and rigidly attached to the lower bar and the opposite end of the lower bar being bent upwardly and rigidly attached to the upper bar, thereby forming a rigid open-sided frame, and spring-actuated working parts confined between said bars, and a stationary member adapted for attachment to the floor and having means thereon for operative engagement with said spring-actuated parts.

17. A spring hinge of the type set forth, comprising a movable member adapted for attachment in a rabbet formed in the lower end of the door and comprising a pair of parallel bars separated to form a space between them and rigidly connected together at their ends, the spacing and connecting parts being integral parts of the frame and one of said bars being extended to afford means for fastening the frame to the door, and spring-actuated working parts confined between said bars, and a stationary member adapted for attachment to the floor and having means thereon for operative engagement with said spring-actuated parts.

18. In a spring-hinge, the combination with an open-sided frame for carrying the working parts of the hinge comprising a plurality of bars, of means for closing the open sides of the frame.

19. In a spring hinge, the combination with a frame having two opposed and parallel bars joined together, of a transversely extending plate secured to one of the bars, a bolt movably held in the frame and having its forward end confined between one of the bars and said transverse plate, a rigid post in said frame having a head constructed to engage the forward end of said bolt, and automatic means for moving said bolt in one direction.

This specification signed and witnessed this seventeenth (17) day of September, A. D. 1908.

HARRY W. STEELE.

Witnesses:
FANNY FLETCHER,
MINNIE SPAMER.